W. M. BRILLHART.
TROLLEY HEAD.
APPLICATION FILED SEPT. 7, 1916.
1,276,483.
Patented Aug. 20, 1918.
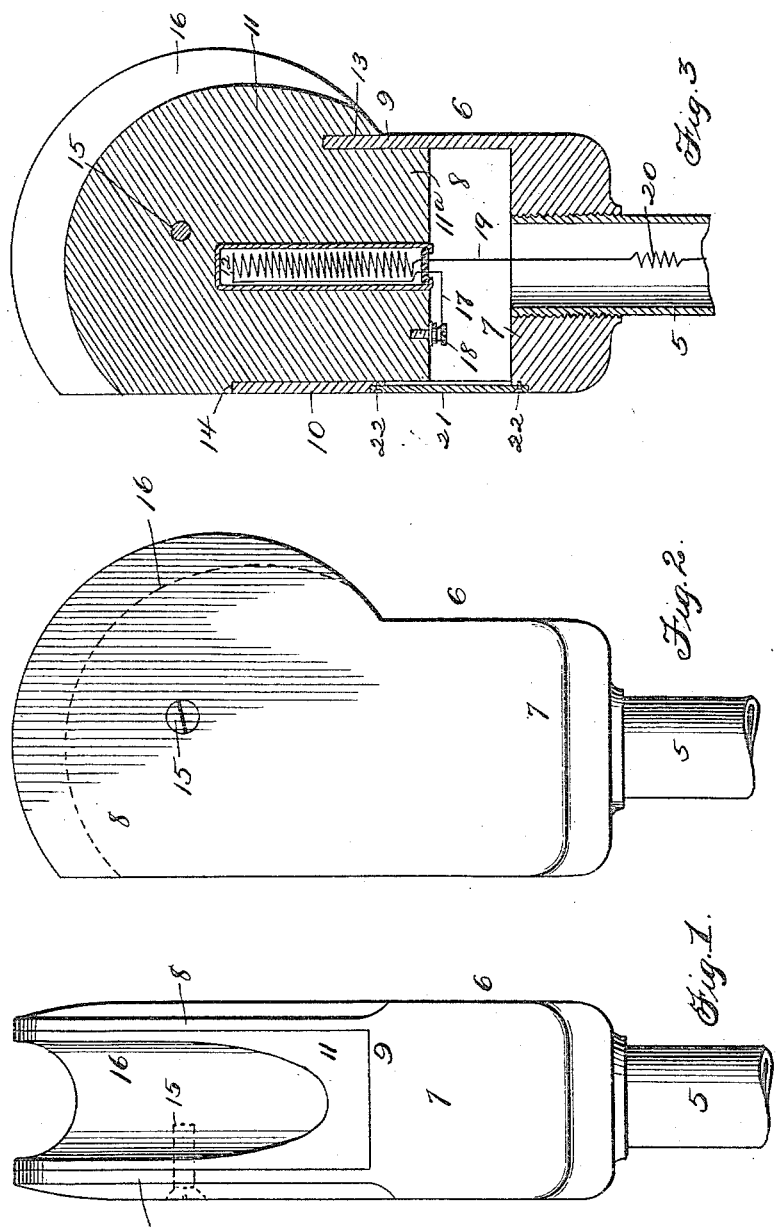

UNITED STATES PATENT OFFICE.

WILLIAM M. BRILLHART, OF YORK, PENNSYLVANIA.

TROLLEY-HEAD.

1,276,483.   Specification of Letters Patent.   Patented Aug. 20, 1918.

Application filed September 7, 1916.   Serial No. 118,854.

*To all whom it may concern:*

Be it known that I, WILLIAM M. BRILLHART, a citizen of the United States, residing at York, in the county of York and State of Pennsylvania, have invented certain new and useful Improvements in Trolley-Heads, of which the following is a specification.

This invention relates to trolley heads and it has for its object the provision of an improved device of this character constructed in such manner that it will not only serve as a current collector in the usual and well-known way but will also serve to remove snow and ice from the trolley wire, whereby the usual injurious arcing that takes place when the trolley wire is covered with ice will be effectually prevented.

Briefly stated, the invention contemplates the provision of a trolley head comprising a heavy heat retaining contact member and means for heating the same electrically from the trolley current. The passage of this heated contact member over the trolley wire results in removing the ice therefrom without injury to the trolley wire. The fact that the contact member directly engages the wire and is of such size as to retain the heat for a considerable period after it has once been heated up renders the device highly efficient.

Further objects and advantages of the invention will be set forth in the detailed description which now follows.

In the accompanying drawing—

Fig. 1 is a front elevation of a trolley head constructed in accordance with the invention.

Fig. 2 is a side elevation thereof, and

Fig. 3 is a vertical sectional view thereof.

Like numerals designate corresponding parts in all of the figures of the drawing.

Referring to the drawing 5 designates a trolley pole and 6 the trolley head. The trolley head comprises a base 7 and spaced side walls 8. The side walls 8 are connected at the front side of the head by a transverse wall 9 and at the rear side of the head by a transverse wall 10. Seated between the side walls 8 is a contact member or block 11. This block is of considerable width and thickness to adapt it to retain heat. Seated within the contact block 11 is a heating element 12, the specific construction of which forms no part of the present invention, it being apparent that varying forms of electrical heaters may be employed for heating the contact block 11. This block is notched at 13 to engage over the upper edge of the transverse wall 9, said wall terminating short of the top of the walls 8. The block 11 is further provided with a shoulder 14 which rests upon the upper edge of the wall 10. It will, therefore, be seen that the lower portion 11ª of the block 11 lies between the walls 8 and the walls 9 and 10 and that it may be readily secured in this position by the insertion of a single retaining screw 15. This screw not only serves to retain the block in position but aids in insuring efficient electrical connection between the block 11 and the head 6. The block 11 is provided with an arcuate groove 16 for the reception of the trolley wire, (not shown), the arcuate nature of this groove permitting the necessary up and down movement of the trolley pole and head while maintaining the parts in engagement with the trolley wire.

The current for the heating element 12 is taken from the trolley wire. To this end one of the terminals 17 of the heating element is connected to a binding screw 18 upon the contact block 11. The other terminal 19 is carried to any suitable ground upon the car. Since the voltage ordinarily employed in the propulsion of trolley cars is much greater than would be necessary to be used in connection with the heating element, I prefer to insert a suitable resistance indicated at 20 in the circuit of the heating element. To permit ready access to the connections of the heating element, a removable plate or door 21 is secured by screws 22 within the wall 10. It will be noted that the contact of the block with the trolley wire is a sliding contact. Therefore, the ice upon the trolley wire is subjected to a rubbing action in the presence of heat. Consequently the action of the device is more efficient than would be the case with a rolling heated member or with a sliding member that is not heated.

While the elements shown and described are well adapted to serve the purposes for which they are intended, it is to be understood that the invention is not limited to the precise construction set forth but that it includes within its purview such changes as come within either the spirit or the exact terms of the appended claims.

Having described my invention what I claim is:—

1. A device of the character described comprising a hollow head, consisting of spaced side walls and connecting transverse walls, a solid block fixedly seated in said head and having an arcuate groove formed in its face to adapt the block for direct engagement with a trolley wire and an electrical heating element seated in said block, one of the terminals of which has electrical connection with said block.

2. A device of the character described comprising a hollow head, consisting of spaced side walls and connecting transverse walls, a solid block fixedly seated in said head and having an arcuate groove formed in its face to adapt the block for direct engagement with a trolley wire, an electrical heating element seated in said block, one of the terminals of which has electrical connection with said block and interengaging means between the block and the transverse walls of the head.

3. A device of the character described comprising a hollow head having spaced side walls and connecting transverse walls, said transverse walls terminating a material distance below the top of the side walls, a solid block and means for electrically heating said block, said means comprising a resistance coil located within said block, said block being provided with an arcuate groove extending across its top and along one side to thereby adapt said block for direct sliding contact with a trolley wire and means for keeping said block in position between said side walls.

4. A device of the character described, comprising a head having spaced side walls, said head being open at its front and rear faces throughout its upper portion, a thick block filling the space between the side walls and the sides of which are substantially completely covered by said side walls, means for fixedly holding said block in the head, said block having an arcuate groove extending across its top and along one side to adapt it for continuous contact with the trolley wire throughout varying positions of the trolley pole and electric heating means embedded in said block for heating the same.

5. A trolley head comprising a relatively heavy solid contact block and means to heat the same consisting of an electric heater embedded within said block and in circuit therewith.

In testimony whereof I affix my signature in presence of two witnesses.

WILLIAM M. BRILLHART.

Witnesses:
NOAH C. MAY,
JOHN G. DEETER.

Copies of this patent may be obtained for five cents each, by addressing the "Commissioner of Patents, Washington, D. C."